United States Patent [19]

Drews

[11] 4,087,007
[45] May 2, 1978

[54] CARGO PLATFORM SYSTEM

[75] Inventor: Robert E. Drews, Taylor Mill, Ky.

[73] Assignee: Leyman Manufacturing Co., Cincinnati, Ohio

[21] Appl. No.: 746,623

[22] Filed: Dec. 1, 1976

[51] Int. Cl.² .............................................. B60P 1/44
[52] U.S. Cl. ................................................ 214/75 T
[58] Field of Search .................. 74/405, 242; 254/188, 254/189, 196; 187/26, 9 R; 214/75 R, 75 T, 77 P

[56] References Cited

U.S. PATENT DOCUMENTS

| 303,059 | 8/1884 | Sinnamon | 74/405 |
|---|---|---|---|
| 662,401 | 11/1900 | Dyer | 74/405 |
| 3,275,170 | 9/1966 | MacRae et al. | 214/75 T |
| 3,371,805 | 3/1968 | Himes | 214/75 T |
| 3,734,239 | 5/1973 | Martin et al. | 214/75 T |
| 3,800,915 | 4/1974 | Himes | 214/75 T |

*Primary Examiner*—Lawrence J. Oresky
*Attorney, Agent, or Firm*—Wood, Herron & Evans

[57] ABSTRACT

An improved cargo platform system of the type particularly adapted to be mounted on the rear of a truck's cargo body. The cargo platform includes, in the preferred embodiment, a first section pivotally mounted along its front edge to a combined elevating and storing mechanism fixed to the cargo body, and a second section pivotally mounted to the first section adjacent the rear edge of that first section. The two platform sections include support structure adapted to maintain the platform sections in substantially coplanar configuration when those sections are horizontally disposed in the elevating attitude. An interconnect structure is provided that maintains the folded platform sections in latched engagement with the elevating and storing mechanism when the folded platform sections are vertically disposed in the storage attitude. When in the vertical storage attitude, the folded cargo platform may be lowered from an upper position where it at least partially closes the cargo body's opening to a lower position beneath the cargo body's bed level so as to provide ingress into and egress from the cargo body. Stop structure mounted to one of the cargo platform and the cargo body interact with the other of the platform and body so as to prevent the cargo platform from touching ground in the lower position. The combined elevating and storing mechanism is of a chain and compounding sprocket type, the sprocket being movable into and out of compounding position with the chain in a path parallel to the plane of the cargo body's opening. The compounding sprocket is permanently fixed to, i.e., not removable from, the cargo body.

4 Claims, 10 Drawing Figures

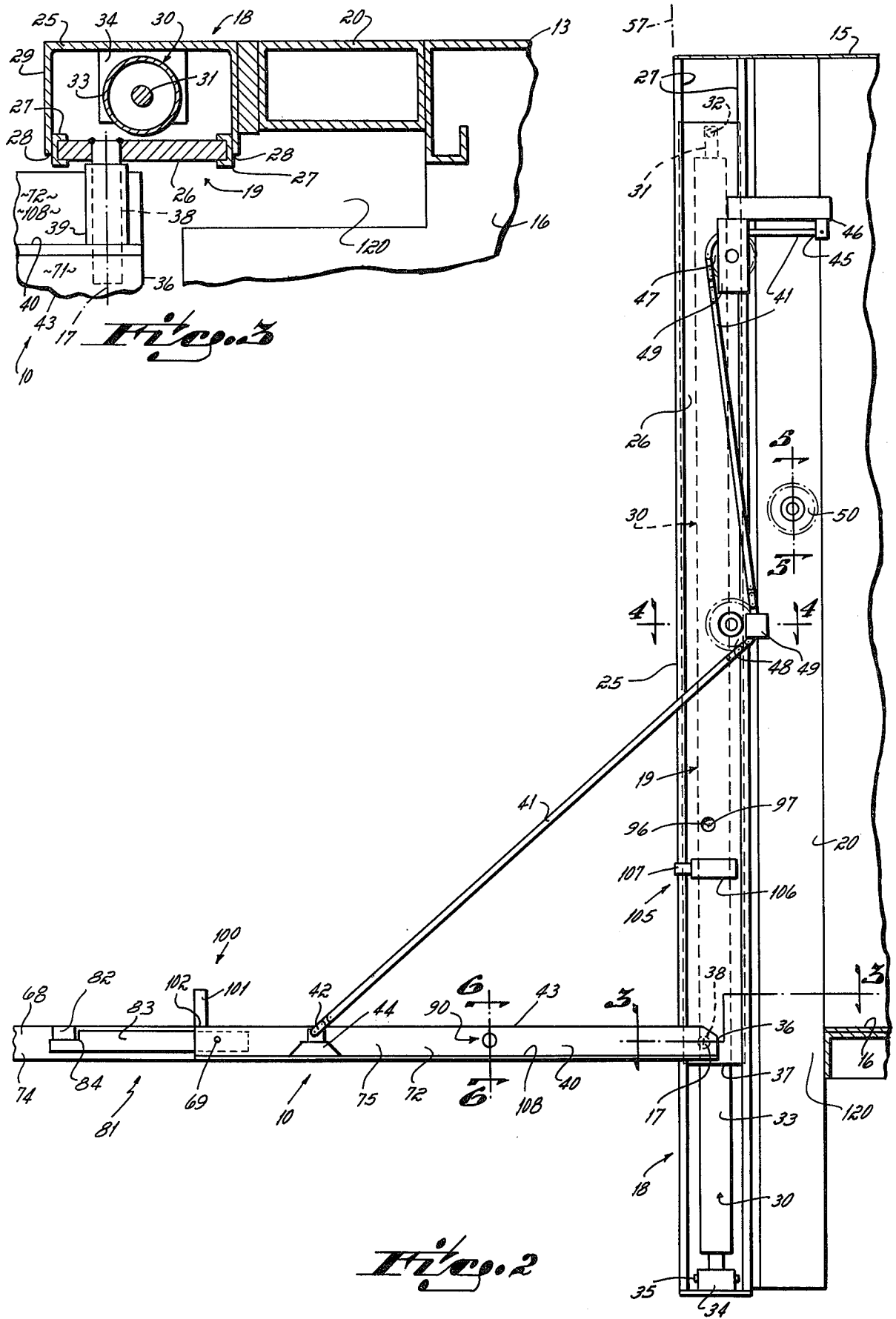

CARGO PLATFORM SYSTEM

This invention relates to cargo platforms. More particularly, this invention relates to an improved cargo platform structure in combination with a particular type of combined elevating and storing mechanism for that platform, i.e., an improved cargo platform system.

Cargo platforms that are operable as elevators, and that are storable somewhere about a truck's cargo body so as to be movable with the truck, are well known in the prior art. Generally, such cargo platforms are mounted in combination with a specially designed, combined elevating and storing mechanism that is supported by, i.e., fixed to, the sides and/or bed of the truck's cargo body at the rear thereof. Such cargo platforms may function solely as elevators, or they may also function as complete or partial closures in the form of doors or tailgates for the cargo area defined by the cargo body. During use such a cargo platform is, of course, movable between (a) a storage position where, depending on the structure of the platform, the platform may be folded upon itself beneath the truck bed, the platform may be vertically disposed relative to the bed of the truck body so it at least partially closes off the access opening of the cargo body, or the platform may be horizontally disposed closely adjacent the ceiling of the truck body, and (b) a horizontal or open or elevator position where the storage area of the cargo body is readily accessible for ingress and egress, and the cargo platform can be raised or lowered as an elevator.

When a cargo platform, in combination with a combined elevating and storing mechanism, is used as an elevator, the cargo platform is first moved from its storage position to its horizontal or cargo handling position. Once in the horizontal position, the platform may be moved up and down between the bed or floor of the cargo body, and ground level or a loading dock. Such elevator like movement allows quick, efficient loading and unloading of the truck's cargo space by providing lift means which permits the platform to be adjusted to a first loading level (e.g., the cargo body's bed or floor level) for easy transferral of the cargo onto the platform and, then, to be raised or lowered in a horizontal plane to a second level (e.g., ground level) for easy transferral of the cargo off the platform. A particularly useful type of such a combined elevating and storing mechanism for cargo platforms is illustrated in the patent to W. H. Himes, U.S. Pat. No. 3,371,805. The storage attitude of the cargo platform described in that Himes patent is one of being vertically disposed above the bed of the truck body so that the platform itself at least partially closes the rear cargo opening of the truck's cargo body.

In recent years, it has been found desirable to provide a cargo platform structure which is of a length, when in the elevator position, greater than the height of the truck cargo body's floor or bed above ground level, in combination with a combined elevating and storing mechanism, for use with a truck cargo body having a West Coast type axle system. Generally speaking, a West Coast axle system relates to the wheel and axle suspension system, i.e., the running gear, positioned at the rear of the truck's cargo body. In the West Coast axle system, a vertical plane that includes the rearmost surface of the cargo body is nearly tangentially disposed with the rearmost pair of wheels. That is, while no point on the rear wheels usually extends beyond the rear end of the cargo body, the rearmost point on the rear wheels' periphery comes very close to intersecting a plane of the rear wall of the cargo body. Such a West Coast axle system has become very popular in recent years on tractor trailer rigs. One reason is that such an axle system aids the carrier in complying with so-called bridge laws of various states. The bridge laws, in effect, require that a certain distance be maintained between the cab for the tractor trailer and the trailer body's rear axle so that excess weight will not be concentrated on bridges as the tractor trailer rig progresses thereover. Further, the West Coast axle system, by positioning the rear running gear at the very rear of the trailer, i.e., the cargo body, permits the payload or cargo to be stacked substantially evenly throughout the cargo body from the front to the rear thereof. Thus, the West Coast axle system precludes the necessity for a complex weight distribution plan for the cargo to be carried within the trailer. Further, it is now required under Federal laws that a bumper be positioned at the very rear of the trailer, i.e., the cargo body, on tractor trailer rigs, the bumper being required to extend down to about 20 inches above road level, to prevent automobiles or other vehicles from running underneath the trailer in case of accident. However, with the West Coast axle system no separate bumpers are required because the rearmost wheels themselves act as the bumper, and no extra structure is required to satisfy the Federal requirements.

A cargo platform, and combined elevating and storing mechanism, such as is disclosed in U.S. Pat. No. 3,371,805, i.e., a cargo platform, that is moved to a vertical closure position above the bed of the cargo body in tailgate fashion for storage purposes solves the cargo platform storage problem when a West Coast axle system is used on the truck body. But in certain applications where a combined elevating and storing mechanism for that cargo platform is required, it is highly desirable that the cargo platform be substantially greater in length than the height of the truck body's bed above ground level. This for the reason that certain industries have standard loading carts of a length on the order of 60 inches with a width on the order of 30 inches. The height of an average truck body's bed above ground level is only on the order of 45 inches. For efficient loading of the truck's cargo body with such carts it is highly desirable to have a cargo platform dimensioned to permit two of such loading carts to be positioned side-by-side and axially, i.e., longitudinally, of the cargo body. This requires a cargo platform having a length of at least about 70 inches and a width of at least about 70 inches.

The width dimension causes no problem since the normal bed width for the trailer, i.e., cargo body, of a tractor trailer rig is about 80 inches or more. But the required length dimension leads to a definite problem associated with cargo platforms of the design disclosed in U.S. Pat. No. 3,371,805 at those times when it is desired to make the rear access opening of the cargo body open and accessible from a loading dock, i.e., at those times when the bed of the truck's cargo body is to be directly accessible from a loading dock and the cargo does not have to be lifted from ground level to the cargo body's bed level by use of the elevator function. During such periods of use the extended length cargo platform must be stored in such a manner that the truck's cargo body can be backed up directly adjacent or abutting the loading dock. One potential way of storing the cargo platform illustrated in U.S. Pat. No. 3,371,805, if of extended length, is simply to pivot or drop the platform down from its vertical closure position to a horizontal or elevating position to make the inside of the trailer truck body accessible for loading. However, in this attitude the truck's cargo body cannot be backed up immediately adjacent to the loading dock, whether the platform is positioned at ground level or at bed level of the cargo body, because the platform will abut the loading dock footing before the cargo body abuts the dock. Further, and when the cargo platform is of a length greater than the height of the cargo body's bed above ground level, the platform shown in U.S. Pat. No. 3,371,805 cannot be allowed to swing free to hang downward from the rear edge of the cargo body's bed because the platform would not hang vertically, but would hang at an angle extending rearwardly of the cargo body and would engage the ground. With the extended length platform in such a rearward angulated attitude, the cargo body could not be backed up against the loading dock; any attempt to locate the cargo body adjacent the loading dock results in establishing a gap of substantial width (depending on the angle of the hanging platform relative to a vertical plane) between the loading dock and the cargo body bed's rear edge because the cargo platform's free or outermost edge would contact the loading dock footing before the cargo body abutted the dock.

One structural and method solution to the extended length cargo platform problem discussed immediately above is illustrated in the patents to W. H. Himes, U.S. Pat. Nos. 3,791,541, 3,800,915, and 3,804,276. The cargo platform structure illustrated in those patents is foldable upon itself to establish a storage attitude. This foldable or storage attitude is desirable when the cargo platform itself, in a horizontal elevator position, is of a length greater than the height of the cargo body's bed or floor above ground level. When in the folded or sandwich storage attitude, the folded platform can be stored in an over-the-road attitude in a usual vertically upright attitude whereat at least a portion of the rear access opening of the cargo body is closed as shown in FIG. 12 of U.S. Pat. No. 3,804,276. Importantly, the folded cargo platform also can be stored in a vertical storage attitude at which it hangs freely down beneath the floor or bed of the cargo body so that the body can be backed adjacent a loading dock as shown in FIGS. 2 and 7 of U.S. Pat. No. 3,804,276. However, and to achieve this latter hanging storage attitude, the cargo platform is preferably first disposed at ground level at which location the two platform sections are pivoted into the sandwich or folded configuration. Thereafter, the platform is raised through operation of the combined elevating and storing mechanism while simultaneously allowing the folded platform to pivot about its pivotal connection with that mechanism until the platform hangs freely in sandwich configuration beneath the truck's cargo body in a substantially vertical attitude. Preferably wheels are provided adjacent the pivot joint of the two cargo platform sections so as to reduce the frictional contact with the ground as the sandwich configured or folded sections are raised into the substantially vertical attitude. This storage method is particularly illustrated in FIGS. 5–7 of U.S. Pat. No. 3,804,276.

The cargo platform structure and operation methods illustrated in the U.S. Pat. Nos. 3,791,541, 3,800,915 and 3,804,276 do, in fact, provide a practical solution, in a West coast axle system type of truck cargo body, to the problem of storing cargo platforms having a length greater than the height of the cargo body's bed above ground level in a vertical storage position beneath the floor or bed of the cargo body so the body's rear access opening can be backed adjacent a loading dock. However, that method and structure is less than totally desirable under certain field circumstances in that it requires the truck's driver to drag the folded platform over ground level for a limited distance so as to dispose same in that cargo body-open, but platform vertically stored beneath the cargo body's bed, attitude. For example, and during use in the field, the ground itself may not be level, thereby causing undue wear and tear on the cargo platform, as well as on the combined elevating and storing mechanism itself. Further, and in accord with the method taught in U.S. Pat. No. 3,804,276, it is definitely preferred that the combined elevating and storing mechanism be operated until the folded cargo platform is lifted off ground level, i.e., until the folded cargo platform hangs freely, when storing same in the cargo body-open position. However, and in the field, it sometimes occurs that the elevating and storing mechanism is not operated to this extent by the truck driver, i.e., sometimes the folded cargo platform is not completely lifted off the ground. If the platform is left touching the ground by the truck driver, and the driver thereafter attempts to back up the truck, the cargo platform structure, and/or the combined elevating and storing mechansim is exposed to the possibility of substantial damage. Further, and when the cargo platform shown in U.S. Pat. No. 3,804,276 is to be stored so that the folded cargo platform hangs freely beneath the cargo body's bed or floor, latch structure must be used to maintain the cargo platform's two sections in folded or sandwich configuration. If the latch structure is not activated when the platform sections are folded one on top the other, it is possible that the platform's rear section will fall toward ground level from its vertical storage attitude as the cargo platform is lifted off ground level until it hangs freely beneath the cargo body's floor. This could provide a potential safety problem to the truck driver, as well as to the operator charged with loading and unloading the cargo body. Thus, under certain field conditions, and if the cargo platform structure, and combined elevating and storing mechanism, as illustrated in U.S. Pat. No. 3,804,276, are not properly used by the truck driver, or operator charged with loading/unloading of the cargo body, it is possible to render the cargo platform and/or the combined elevating and storing mechanism inoperative which, of course, results in maintenance on the unit as well as downtime for the truck, both economically undesirable from the truck owner's standpoint, and it is possible to generate a potential safety problem for the user of the unit.

Hence, it has been a primary objective of the invention to provide a cargo platform in combination with a combined elevating and storing mechanism, i.e., an improved cargo platform system, that provides improved structural and method step characteristics which permit the cargo platform to be suspended down beneath the floor of a cargo body particularly when the cargo platform is of a length greater than the height of the cargo body's floor above ground level.

It has been another objective of this invention to provide a cargo platform, in combination with a combined elevating and storing mechanism, i.e., an improved cargo platform system, that provides improved structural and method characteristics which permit the platform to be immobilized relative to its pivot axis and stored vertically upright in a first storage attitude at least partially above the cargo body's floor where the platform presents at least a partial closure to the cargo body's access opening, and which permits the immobilized platform to be lowered in the vertical plane established in the first storage attitude from that first attitude into a second storage attitude completely beneath the cargo body's floor where the body's cargo area is open to receive or discharge cargo.

It has been a further objective of this invention to provide an improved cargo platform system of the type comprising a flexible tension member and a compounding wheel for that flexible tension member, the compounding wheel having novel structural characteristics that permit same to be moved between operative and inoperative positions relative to the flexible tension member without removing the compounding wheel from structural interconnection with the system.

Other objectives and advantages of this invention will be more apparent from the following detailed description taken in conjunction with the drawings in which:

FIG. 2 is a cross-sectional view taken along line 2—2 of FIG. 1;

FIG. 3 is a cross-sectional view taken along line 3—3 of FIG. 2;

THE ELEVATING AND STORING MECHANISM

Figure 1:
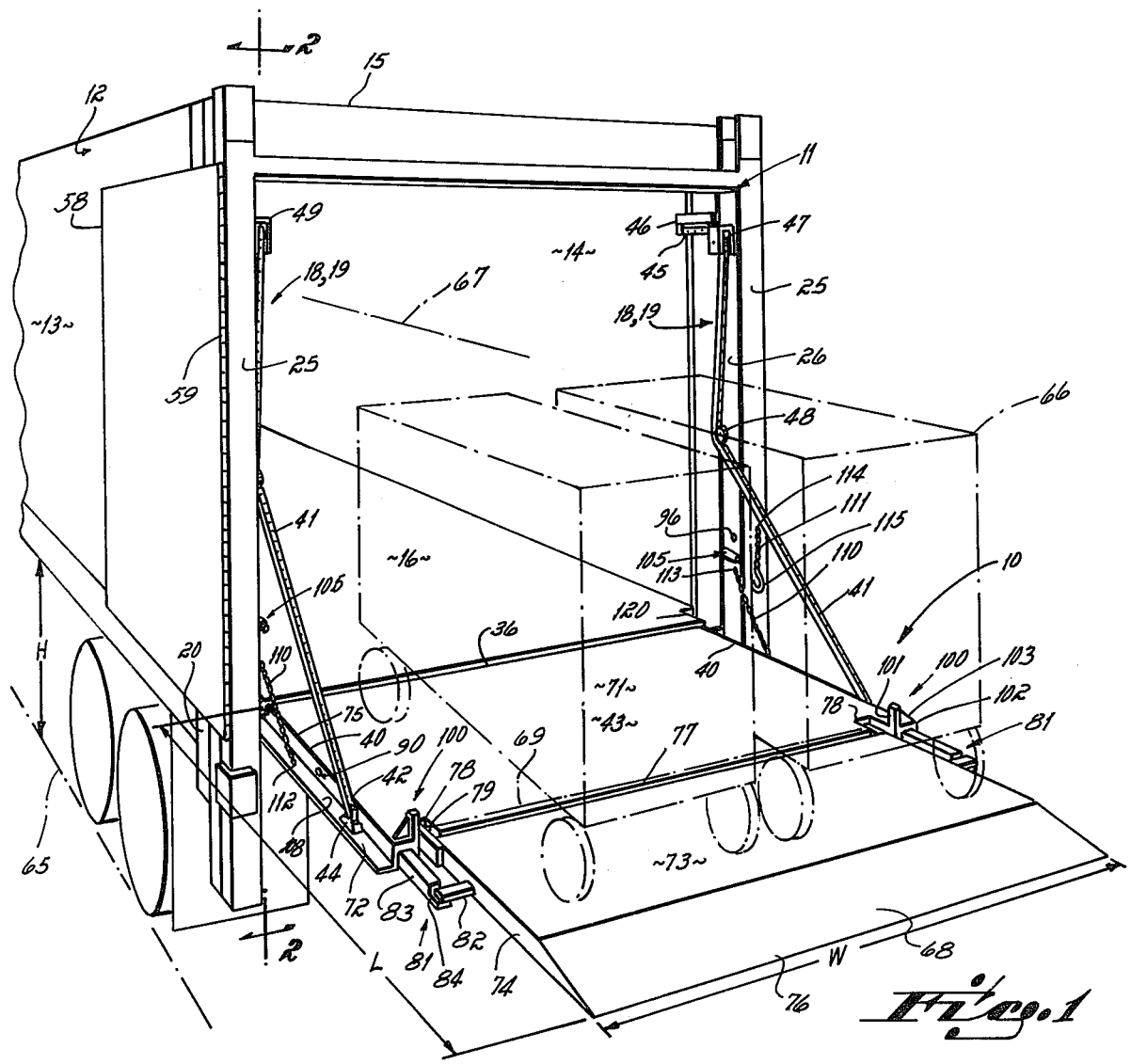
FIG. 1 is a perspective view illustrating a cargo platform in combination with a combined elevating and storing mechanism, the platform being disposed at a cargo body's bed or floor level, in extended or platform configuration, and in an elevator attitude.

Cargo platform 10 is suitably located at the rear or access opening 11 of a cargo body 12, e.g., a trailer or truck body, having side walls 13, 14, a top wall 15, and a bed or floor 16, see FIG. 1. The cargo platform 10 is pivotally connected on pivot axis 17 to elevating and storing mechanism 18 at the bottom of and between two mast assemblies 19. Each mast assembly 19 is fixed or secured to a rear corner post 20 of the cargo body 12 at the rear vertical corner edges thereof.

Each mast assembly 19 includes a vertical C-shaped channel or mast guide 25 mounted to a corner post 20, see FIGS. 2 and 3. Each mast guide 25 is mounted so that its open side faces the other mast guide across the rear access opening 11 of the cargo body 12. A slide bar or mast 26 is received within each mast guide 25 for vertical sliding movement therein. Each mast 26 is guided in its vertical sliding movement by channel pieces 27 welded to the outer ends, as at 28, of each mast guide's sides 29.

Each mast 26 and mast guide 25 is also connected by mast lifting means to selectively raise and lower the mast in its mast guide, see FIGS. 2 and 3. The mast lifting means may be either mechanical, hydraulic or pneumatic means, such as a linear fluid motor 30 which is disposed within the interior of each of the mast assemblies 19. Each motor 30 includes a ram 31 which is coupled to mast 26, as at 32, and a cylinder 33 which is coupled to mast guide 25 (through brace plate 34), i.e., to the cargo body 12, as at 35. Each fluid motor 30 is actuated by pressurized fluid supplied by a pump or hydraulic power pack, not shown, mounted within a storage box, not shown, carried beneath the floor or bed 16 of the cargo body 12 at a position centrally located of the trailer body. The hydraulic power pack may be electrically controlled from equipment stored in a control box, not shown. The control box, not shown, may store a flexible electrical conduit and controller, not shown, to permit the cargo platform's operator to stand away from or in back of the truck body 12 to observe and control operation of the cargo platform 10. This mast assembly 19 mechanism is more particularly set forth in one or more of the Himes U.S. patents previously referred to herein.

The cargo platform 10 is pivotally mounted in a first pivotal joint or pivot axis 17 adjacent its front edge 36 near the bottom ends 37 of the masts 26, see FIGS. 2 and 3. This first pivotal joint is achieved, on each side of the platform, by means of a pin 38 fixed to the mast 26 which is received in a collar 39 fixed to the side edge 40 of the platform 10 adjacent its front edge 36. When it is open, the cargo platform 10 is maintained in a horizontal position by means of flexible tension means such as, e.g., chains 41, belts or wires, on each side of the platform, each of which cooperates with one mast assembly 19. Each chain 41 is permanently secured at its outer end 42 to the cargo platform's front section 43, such as by pinning to block 44 mounted on side edge 40 of the platform. Each chain 41 is permanently connected at its other end 45 to finger 46, the finger extending substantially beyond yet being fixed to its associated mast 26 intermediate the ends of the mast.

Figure 4:
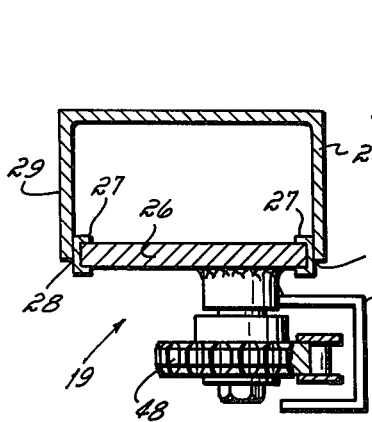
FIG. 4 is a cross-sectional view taken along line 4—4 of FIG. 2.

Each mast 26 also mounts a first freely rotating idler sprocket 47 mounted adjacent the finger 46, and a second idler sprocket 48 mounted in position intermediate the finger 46 and the bottom 37 of the mast, see FIGS. 2 and 4. A U-shaped guide 49, fixed to the mast 26, cooperates with each idler sprocket 47, 48 to retain the chain 41 in engagement therewith, see FIG. 4. As permanently connected at both ends 42, 45, each chain 41 proceeds from its end 42 pinned at block 44 under the idler sprocket 48, and up over the idler sprocket 47 to its other end 45 fixed to finger 46.

Figure 5:
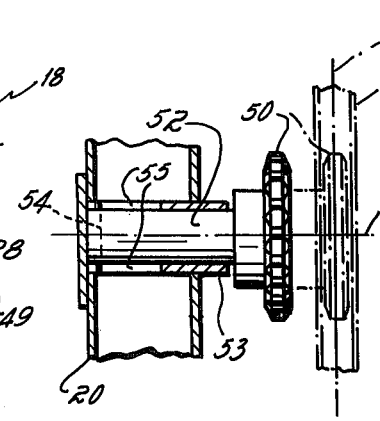
FIG. 5 is a cross-sectional view taken along line 5—5 of FIG. 2.

Each finger 46 extends forward of each mast guide 25 so as to be able to present the chain 45 for engagement with a selectively positionable compounding sprocket 50, see FIGS. 2 and 5. The compounding wheel or sprocket 50 is mounted on adjacent rear corner post 20, and is selectively positionable between an in position illustrated in solid lines in FIG. 5 and an out position illustrated in phantom lines in FIG. 5 relative the plane 51 of chain 41, i.e., relative to that corner post. The compounding sprocket 50 is mounted on one end of a shaft 52 which is secured for limited axial movement within a sleeve 53, the sleeve being rigidly secured to the corner post 20. The other end of shaft 52 radially mounts a pin 54 which has its ends captured in a pair of axial slots 55 formed in the sleeve 53. In the compound position, and as is illustrated in phantom lines in FIG. 5, the compounding sprocket 50 is disposed in the plane 51 of the chain 41, that chain plane 51 remaining constant, i.e., immobile, in light of the fixed end points 42, 45 of the chain and the fixed locations of first 47 and second 48 idler sprockets. Thus, the compounding sprocket 50 is always in connected assembly with the combined elevating and closing mechanism 18, i.e., the compounding sprocket does not have to be removed from operational assembly therewith at any time to move same between compounding and non-compounding positions. Further, the compounding sprocket 50 is axially movable along its rotational axis 56 between its operative and inoperative positions, that axis 56 being in a plane parallel to the plane 57 of the truck body's rear opening 11.

When the cargo platform 10 is to be operated in elevator like fashion, each compounding sprocket 50 is moved to the non-compound position shown in solid lines in FIG. 5, thereby removing the compounding sprocket from compounding position with chains 41. As the masts 26 are moved upwardly or downwardly relative to the mast guides 25 by fluid motors 30, the compounding sprocket 50 remains out of compounding position and does not engage the chains 41 and, thus, the cargo platform 10 operates in elevator fashion. On the other hand, when it is desired to provide the cargo platform 10 in a vertical attitude from a horizontal or open attitude, i.e., in a first or second storage attitude, the compounding sprockets 50 are simply extended to the compounding position shown in phantom lines in FIG. 5 so as to present the compounding sprockets in the vertical plane of the chains 41. This permits the chains 41 to be compounded or doubled as the masts 26 move upwardly within the mast guides 25 to orient vertically the cargo platform 10.

A spring loaded plunger 105 is also mounted to each mast assembly 19. Each spring loaded plunger 105 is in the nature of a sleeve 106 fixed to the mast 26, same having a T-shaped plunger head 107 (not shown in detail) spring loaded outwardly by a spring (not shown) constrained within the sleeve. The spring loaded plungers 105 are arranged so as to cooperate with the edges 108 of the cargo platform's front section 43. Thus, the spring loaded plungers 105 function to apply constantly an opening or pivoting force moment to the cargo platform 10 when same is in both vertical storage attitudes illustrated in FIGS. 7 and 10. This spring loaded opening or pivoting force moment may be nullified in the vertical or storage attitude by interaction of the interconnect bolts 90 with the masts as described in detail below.

Figure 7:
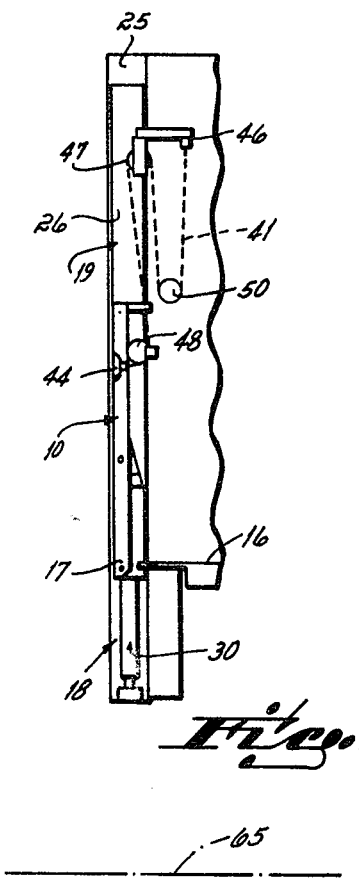
FIG. 7 is a diagrammatic side view of the cargo platform and combined elevating and storing mechanism, the structure being oriented in the first storage or closure attitude.

Two separate safety chains 110, 111 are provided to cooperate with the combined elevating and closing mechanism 18 and the cargo platform 10 so as to make use of this structure as safe as possible for the operator. The first safety chains 110 interconnect the mast 26 of each mast assembly 19 with the related side edge 40 of the front platform section 43 at points 112 and 113 as illustrated in FIG. 1. The purpose of these safety chains 110 is to retain the cargo platform 10 in the substantially horizontal or elevating attitude illustrated in FIG. 1 in the unlikely event that the flexible tension members, i.e., the compounding chains 41 should break on one or both sides of that platform. The second safety chain 111 is permanently connected to a mast assembly 19, same being connected to the fixed or C-shaped channel member 25 at one end 114. The other end of safety chain 111 is provided with a hook 115 adapted to cooperate with eye (not shown) fixed to the understructure (not shown or described) of the front cargo platform section. The hook 115 of the second safety chain 111 is interconnected with the eye when the cargo platform is in the first storage or over-the-road attitude as illustrated in FIG. 7. With the platform hooked by chain 111 in this manner, the pressure in fluid motor 30 may be relieved thus relaxing the tension on chains 41 so that chain 111 will carry the weight of the platform as the truck body 12 travels over the road.

Suitable rear doors 58 may be mounted on hinges 59 to the corner edges of each of the mast assemblies 19, same being pivotable between a completely open position whereat they are flush against the cargo body's side walls 13, 14 as shown in FIG. 1, and a completely closed position whereat they cover the entire rear opening 11 of the cargo body 12. In the door 58 closed position, and with the cargo platform 10 stored vertically in either the extended configuration or the sandwich configuration, the platform, the elevating and storing mechanism 18, and the interior of the truck body 12, are closed to the environment, e.g., weather conditions, surrounding the truck body.

THE CARGO PLATFORM

As mentioned, it is oftentimes desirable to provide a cargo platform 10 that has an extended length L substantially greater than the height H available between ground level 65 and the floor 16 of the truck body 12. For example, a distance between ground level 65 and the bed 16 of a trailer truck body 12 on the order of about 45 inches is considered average. However, oftentimes a cargo platform 10 is preferred to have an extended length L on the order of, for example, 80 inches, with a width W substantially equal to the bed 16 width of the trailer truck body 12. This for the reason that certain industries find it desirable to be able to position two mobile container or loading carts 66 on the cargo platform 10 at the same time when the cargo platform is being used as an elevator. Such loading carts 66 may be of differing external dimensions but one standard cart is about 60 inches in length and 30 inches in width. Two of such dimensioned carts 66 can fit side-by-side, i.e., widthwise, because one standard width of a truck body 12 and, hence, of the cargo platform fixed to the end of the truck body, is about 80 inches. But two of such dimensioned carts 66 cannot be positioned longitudinally of the trailer truck body's axis 67 unless the cargo platform 10 is greater than the length of each cart 66; this requires that the length L of the cargo platform be substantially longer than the height H of the truck body's bed 16 above the ground 65, all as shown in FIG. 1.

The cargo platform 10 basically includes the front section 43 and a rear section 68; that is, the cargo platform 10 is articulated into two half sections 43, 68 with these sections being hinged together at a second pivotal joint along a hinge axis 69 transverse to the axis 67 of the truck body 12. The platform's front section 43 is pivotally mounted on first pivot axis 17, as mentioned, between the two mast assemblies 19 so that the whole platform 10 may pivot between a first storage position whereat it is disposed vertically above the bed 16 of the truck body 12 and at least partially closes the rear opening 11 of the body (see FIG. 7), and an elevator position whereat it extends horizontally and rearwardly of the truck body (see FIGS. 1 and 9).

The platform's front section 43 includes a metal plate 71 provided with an angle member 72 mounted along each side edge 40 for support, each angle member being welded to the plate. Suitable ribs, not shown, may be mounted beneath the plate 71 to provide added structural support if desired. The chain blocks 44 are fixed to the angle members 72.

The rear section 68 of the cargo platform 10 is also in the form of a plate 73 having depending side walls 74, the side walls being of substantially the same height as the side walls 75 of the front section 71. Further, the rear section 68 may also be provided with reinforcing ribs, not shown, beneath the plate 73 if desired. The rear end 76 of the rear section 68 is provided with a taper or bevel or otherwise configured to provide easy access for the carts 66, fork trucks or other loading/unloading devices as they are located on the platform 10 preparatory to lifting same from ground level to truck bed level and vice versa, when the elevating and storing mechanism 18 is in the elevating attitude.

The rear end of the front section 43 and the front end of the rear section 68 are pivotally connected at the second pivotal joint along pivot axis 69 so as to permit the two sections of the platform 10 to be pivoted between an extended configuration (see FIGS. 1, 2 and 9) and a folded or sandwich configuration (see FIGS. 7 and 10) as desired by the operator. The trailing edge 77 of the front section 43 is notched, as at 78, at each corner to accommodate pivot mountings 79 by which the rear section 68 is pivotally mounted to the front section 43. The pivot mountings 79 are positioned such that the plane of the top surface of the rear section 68 is in substantially the same plane as the top surface of the front section 43 when the two are in the extended position.

Supports 81 are also associated with each side of the two platform sections 43, 68 to hold the sections in the platform or extended configuration when desired, part of each support means being carried by each of the sections 43, 68, see FIGS. 1 and 2. Each side of the rear section 68 carries a support block 82 mounted to each side wall 74 and extending outwardly therefrom. Each side of the front section defines a sleeve (not shown in detail) of rectangular cross-section beneath that section's floor 71. Each such sleeve receives a bolt 83 in sliding engagement therewith, the bolt being provided with stops (not shown) that cooperate with the sleeve structure to limit the bolt's extendable movement. Thus, the bolts 83 are extendable to a first position whereat their notched ends 84 receive support blocks 82 in seated relation and thereby support the two sections 43, 68 in extended or platform configuration, see solid lines of FIG. 1. Further, the bolts 83 are retractable to a second position whereat the rear platform section 68 may be folded into sandwich configuration on top of the front platform section 43.

Figure 6:
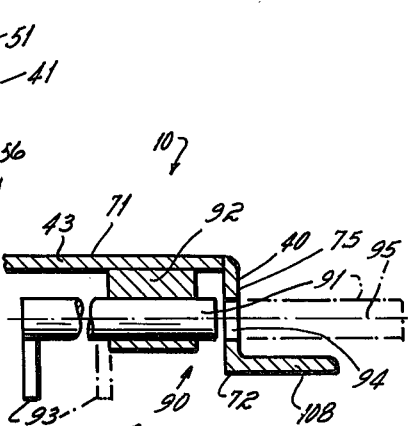
FIG. 6 is a cross-sectional view taken along line 6—6 of FIG. 2.
Figure 10:
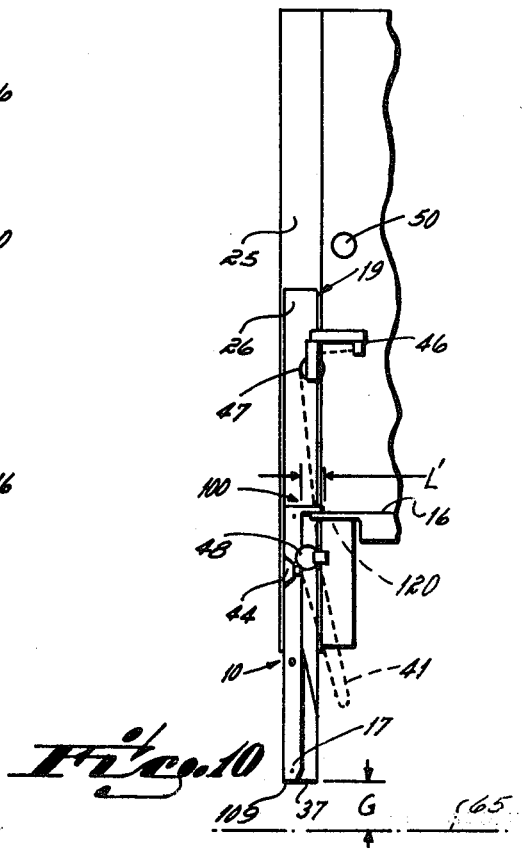
FIG. 10 is a view similar to FIG. 7 but illustrating the platform in the second storage or access attitude.

The cargo platform 10 also carries, on its front platform section 43, a mast interconnect bolt 90 on each side thereof, see FIGS. 2 and 6. Each mast interconnect bolt 90, as illustrated in FIG. 6, is comprised of a rod 91 carried in collar 92 fixed to the underside of the platform floor 71. The rod 91 is provided with a head 93 on the inner end thereof, and is extendable outwardly beyond the side edge 40 of the platform through hole 94 in the side wall 75 of the platform. Each interconnect bolt 90 is slidable between a home or storage position illustrated in solid lines in FIG. 6, and an extended or interconnect position illustrated in phantom lines in FIG. 6, the rod 91 being slidable on an axis 95 disposed parallel to the plane 57 of the rear opening 11 of the cargo body 12. The interconnect bolt 90 on each side of the platform 10 is adapted to function operationally with hole 96 in the mast 26 associated with that side of the platform. The center line 97 of the mast hole 96 is the same distance from the first pivot axis 17 as the center line 95 of the interconnect rod 91 is from that first pivot axis, all as illustrated in FIG. 2. When the cargo platform is in a vertically upright or storage attitude, as illustrated in FIGS. 7 and 10, the interconnect bolts 90 on each side of the first platform section can in fact be moved into the extended position shown in phantom lines in FIG. 6, thereby interconnecting the cargo platform 10 with the respective side masts 26 of the combined elevating and storing mechanism 18. Thus, the interconnect bolts 90 insure that the cargo platform 10 is connected with the masts 26, i.e., is made nonpivotable relative to the masts, when those interconnect bolts are fully extended and received into bolts' holes 96 in the masts themselves. This structural feature is important in connection with the operational method of this invention when translating the cargo platform 10 into the second storage attitude, shown in FIG. 10, from the first storage attitude, shown in FIG. 7, as described in detail below.

Stop structure 100 is also mounted on the front section 43 of the cargo platform 10 along the trailing edge 77 thereof, see FIGS. 1 and 2. The stop structure 100 is in the nature of a pair of feet 101, one being located at each rear corner 102 of the platform. Each foot 101 extends vertically upward from the front section 43 when that platform section is horizontally disposed as shown in FIG. 1. Each foot 101 is reinforced by rib 103 fixed to the floor plate 71 and to the foot itself so as to provide structural rigidity to that foot. When the rear platform section 68 is pivotally folded onto the front platform section 43 in sandwich configuration, and when the folded cargo platform 10 is vertically oriented, all as illustrated in FIGS. 7 and 10, the stops 100 are located at the top edge of the folded cargo platform. The stops 100 are of a length L' sufficient to overlie the bed or floor 16 of the trailer body 12 when the folded cargo platform 10 is vertically disposed as shown in FIGS. 7 and 10. Hence, and in accord with the operational method of this invention whereby the cargo platform 10 is stored in the second storage location as described in detail below, the stops 100 interact or cooperate with the cargo body's floor 16 so as to limit in a positive manner the downward motion of the vertically oriented folded cargo platform 10 during location of same in the second storage position shown in FIG. 10.

OPERATION OF THE SYSTEM

In operation of the system of this invention, the normal over-the-road storage attitude of the cargo platform 10 is as illustrated in FIG. 7. As shown in that Figure, the platform 10 is vertically oriented in a first storage position at which it closes a portion of the rear opening 11 of the cargo body 12 (that rear opening being fully closed by doors 58 when the doors themselves are closed over the platform 10). In this attitude, the interconnect bolts 90 are extended so as to interconnect the folded cargo platform 10 with the masts 26 of the combined elevating and closing mechanism 18, thereby preventing the cargo platform from bearing against the doors 58, i.e., from attempting to pivot about pivot axis 17 toward the open position, as so urged spring loaded plungers 105. Also in this first storage attitude, the compounding sprockets 50 are extended linearly relative to their rotational axes 56 into the plane 51 of the chains 41, thereby causing each chain to be compounded into two loops as illustrated in FIG. 7 so as to draw the folded platform up into the first or over-the-road storage attitude in response to raising of the platform by the hydraulic motors 30.

Figure 8:
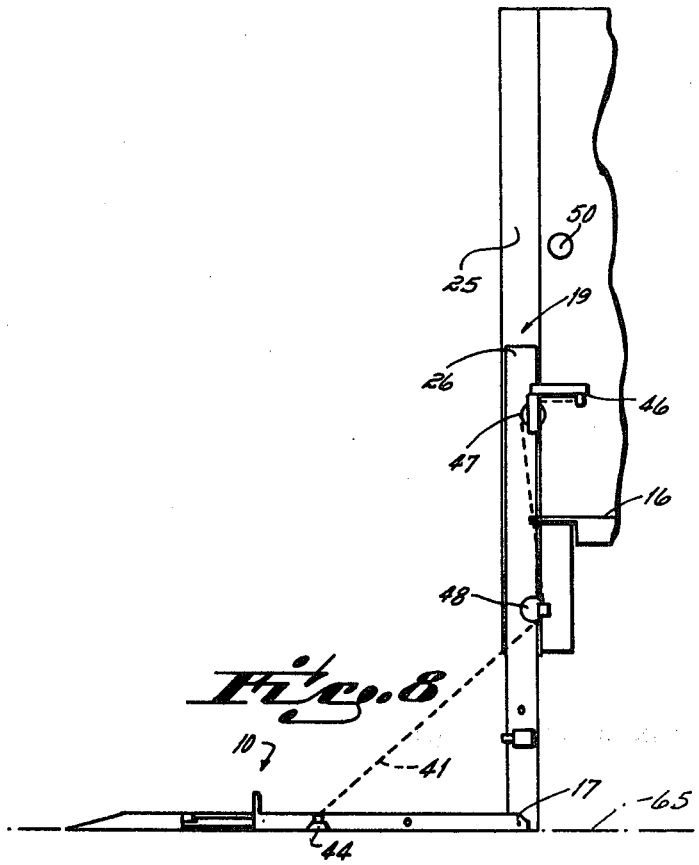
FIG. 8 is a view similar to FIG. 7 but illustrating the platform at ground level in the elevator attitude preparatory to folding same into the sandwich configuration.
Figure 9:
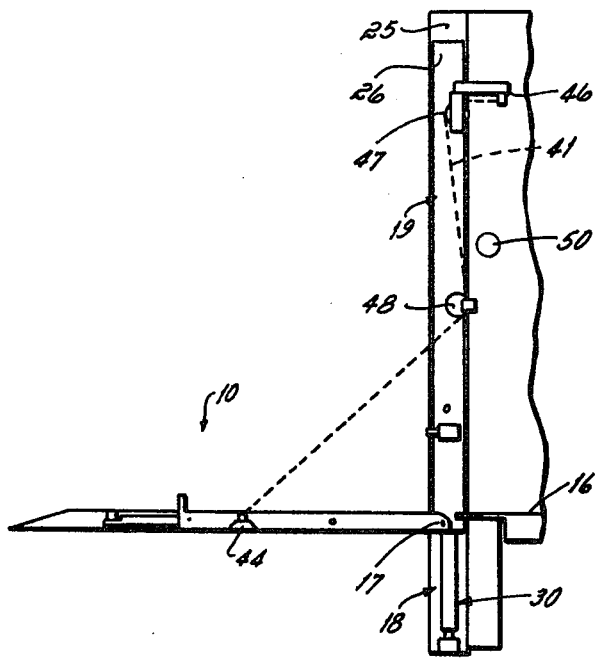
FIG. 9 is a view similar to FIG. 8 but illustrating the platform upraised at floor level of the cargo body in the elevator attitude.

When it is desired to make use of the cargo platform 10 as an elevator, i.e., to orient the platform from the first storage attitude into the horizontal elevator configuration illustrated in FIG. 9, the interconnect bolts 90 are first withdrawn from interconnection with the masts 26 to the retraction position illustrated in solid lines in FIG. 6 while the folded cargo platform is in the first storage attitude. Thereafter the hydraulic motors 30 within the mast assemblies 19 are activated so as to lower the cargo platform toward the ground level 65 as illustrated in FIG. 8. As the cargo platform 10 is lowered in light of the position of the compounding sprockets 50 within the planes 51 of chains, and in response to spring loaded plungers 105 which tend to pivot the cargo platform 10 counterclockwise as shown in the Figures about its first pivot axis 17, the cargo platform is initially pushed and then falls by gravity toward the horizontal attitude as it is lowered to ground level 65. When at ground level the support bolts 83 are extended from underneath the front platform section 43, and the rear platform section 68 is pivotally removed from its sandwich configuration into its horizontal or elevator attitude where the support blocks 82 on the rear section 68 are seated in the notched ends 84 of the support bolts fixed to the front section, thereby positioning the cargo platform 10 in the horizontal or elevator attitude illustrated in FIGS. 1 and 2. In this elevator attitude, and with the compounding sprocket pushed into the noncompounding or solid line position on each mast assembly 19 as illustrated in FIG. 5, the cargo platform 10 can be raised and lowered in elevator fashion in response to the hydraulic motors 30 within the opposed mast assemblies 19 without the chains 41 being compounded, thereby permitting the platform to be raised and lowered in elevator fashion between ground level 65 as illustrated in FIG. 8 and truck bed level 16 as illustrated in FIG. 9.

When it is desired to return the cargo platform 10 into the first storage or over-the-road attitude, the platform is lowered to ground level and the compounding sprockets 50 are moved or extended outward into the plane 51 of the flexible tension chains 41. Further, the rear platform section 68 is simply pivoted about second pivot axis 69 up on top the front platform section 43 (compare solid line position to phantom line position as shown in FIG. 8), and the rear platform section support bolts 83 retracted underneath the front platform section 43. Thereafter, the folded platform 10 is simply upraised by the fluid motors 30. As the folded platform is upraised, and in light of the compounding relation between the compounding sprockets 50 and the flexible tension members, the folded platform is pivoted upwardly about first pivot axis 17 into the vertical over-the-road storage attitude illustrated in FIG. 7 when the fluid motors 30 top out. In this attitude, and as previously explained, the mast interconnect bolts 90 are extended into the phantom line position illustrated in FIG. 6 so as to positively hold the folded platform 10 in vertical or storage relation with the opposed mast assemblies 18.

When it is desired to move the folded cargo platform 10 into the second storage attitude at which same is disposed beneath the truck body's bed 16 (so that the truck body 12 can be backed up against a loading dock or the like, when desired), the platform must be first disposed in the first storage attitude and the interconnect bolts 90 extended as just previously explained. Thereafter, fluid motors 30 are activated so as to lower the cargo platform 10 while retaining the platform in a vertical plane. In other words, and because the cargo platform 10 is bolted to the movable mast 26 of each mast assembly 19, the platform does not pivot open in response to spring loaded plungers 105 as it is so lowered. The platform 10 is simply lowered to the second storage or dock loading attitude, illustrated in FIG. 10, because the cargo platform is interconnected by bolts 90 with the movable masts 26, and because the compounding chains 41 drop away from the compounding sprockets 50 as the platform is lowered. The cargo platform 10 is positively located in this second storage or dock loading attitude by interaction of the platform stops 101 with the truck body's floor 16, thereby preventing further downward motion of the folded platform when same achieves the second storage attitude illustrated in FIG. 10. As located by stops 101 in the second storage attitude, note particularly that the bottom fold edge 109 defined by both platform sections 43, 68 is spaced a discrete gap G above ground level 65. This is most important because it permits the truck driver to drive forward or backward limited distances so as to properly position his truck without fear of damaging the cargo platform 10 structure, or the combined elevating and closing mechanism 18, even after that platform has been disposed in the second storage attitude. Note also, as illustrated in FIG. 3, that open ports 120 are provided in the truck body's floor 16 adjacent each mast assembly 18, each port 120 being positioned in the plane 51 of the chain 41 on each side of the truck body 12. The ports 120 permit the chains 41 to drop down through the cargo body's floor 16 as the folded cargo platform 10 is translated from the over-the-road storage attitude illustrated in FIG. 7 into the dock loading attitude illustrated in FIG. 10. This is important in that it permits the flexible tension members, i.e., the compounding chains 41, to be provided with suitable storage space while the cargo platform is in the second storage attitude, and prevents the compounding chains from kinking or being rendered otherwise subject to maintenance as the folded cargo platform is translated into the second storage attitude from the first storage attitude. Each compounding sprocket 50 remains in the plane 51 of its associated flexible tension member 41 as the cargo platform is lowered from the first storage attitude shown in FIG. 7 into the second storage attitude shown in FIG. 10, thereby insuring that the compounding sprockets 50 will remain in the compounding planes 51 when the folded cargo platform 10 is raised from the second storage attitude back into the first storage attitude. This is important in that same insures the compounding sprockets 50 will be in compounding relation with the flexible chains 41 once again when the interconnect bolts 90 are removed, and when it is desired to open the platform 10 from the first storage attitude shown in FIG. 7 into the elevator attitude shown in FIG. 8.

Having described the preferred embodiment of my invention, what I desire to claim and protect by Letters Patent is:

1. An improved cargo platform system for a cargo opening of a truck body comprising
    a first and a second mast assembly mounted to said truck body, each of said assemblies having a mast guide and a mast movably supported by said guide,
    lift means for moving said masts relative to said mast guides,
    a platform pivotally secured adjacent the lower ends of said masts to permit swinging movement of said platform between horizontal elevator and vertical storage positions,
    a flexible tension member having two ends, one of said ends being connected to said platform and the other of said ends being connected to a first mast, and
    a compounding wheel mounted on a shaft, said shaft being carried in and permanently connected to a sleeve fixed relative to a first mast guide, and said compounding wheel being selectively positionable along its rotational axis in a path parallel to the plane of said cargo opening by axially positioning said shaft within said sleeve between (a) a first operating position whereat said tension member can be engaged by said compounding wheel between said tension member ends when said masts are moved relative to said mast guides for swinging said platform between said elevator and storage positions, at least about one-half the length of said shaft remaining in supportive contact with said sleeve in said fast operating position, and (b) a second operating position whereat said tension member cannot be engaged by said compounding wheel or said shaft when said masts are moved relative to said mast guides for raising and lowering said platform as an elevator.

2. An improved cargo platform system as set forth in claim 1,
    said flexible tension member being permanently fixed to said platform and to said support, and
    said first operating position being in the plane of said flexible tension member, and said second operating position being out of the plane of said flexible tension member.

3. An improved cargo platform system for a cargo opening of a truck body comprising
    a first and a second mast assembly mounted to said truck body, each of said assemblies having a mast guide and a mast movably supported by said guide,
    lift means for moving said masts relative to said mast guides,
    a platform pivotally secured adjacent the lower ends of said masts to permit swinging movement of said platform between horizontal elevator and vertical storage positions, said cargo platform being comprised of a first section mounted along its front edge to said combined elevating and storing mechanism by a first pivotal joint, a second section mounted to said first section adjacent the rear edge of said first section by a second pivotal joint, and a support associated with said two sections for holding said two sections in platform configuration when desired, said two sections being pivotable between platform configuration and sandwich configuration by means of said second pivotal joint,
    a flexible tension member having two ends, one of said ends being connected to said platform and the other of said ends being connected to a first mast,
    a compounding wheel rotatably mounted to a support fixed relative to a first mast guide, said compounding wheel being selectively positionable between a first operating position whereat said tension member can be engaged by said compounding wheel between said tension member ends when said masts are moved relative to said mast guides for swinging said platform between said elevator and storage positions, and a second operating position whereat said tension member cannot be engaged by said compounding wheel when said masts are moved relative to said mast guides for raising and lowering said platform as an elevator,
    an interconnect bolt connected to one of said platform and said first mast, said interconnect bolt being movable as desired by an operator between a non-active position that permits said platform to be raised from and lowered to said elevator position, and an active position when said platform is in a vertical storage position to lock said platform in functional engagement with said first mast, said interconnect bolt thereby cooperating with said mast to permit moving said platform between a first storage position at which same extend above the cargo floor of said truck body to at least partially close said cargo opening and a second storage position at which same is located fully beneath said cargo opening to provide ingress and egress through said cargo opening while retaining said platform in said locked vertical storage position for movement between said first and second storage positions, both storage positions being in the same vertical plane, and
    at least one stop connected to said platform, said stop being adopted to overlie a portion of the cargo floor of said cargo body to locate said cargo platform in said second storage position.

4. An improved cargo platform as set forth in claim 3 further comprising
    structure defining a port in said cargo body floor adjacent said first mast assembly, said port permitting said flexible tension member to descend beneath said floor during lowering of said cargo platform from said first storage attitude to said second storage attitude.

* * * * *